April 6, 1954

C. L. METZ ET AL 2,674,171

DRAFT UNIT FOR WHEEL TRACTORS

Filed March 6, 1948

INVENTORS
C. L. Metz
N. L. Metz
BY
ATTORNEYS

Patented Apr. 6, 1954

2,674,171

UNITED STATES PATENT OFFICE 2,674,171

DRAFT UNIT FOR WHEEL TRACTORS

Claude L. Metz and Noble L. Metz,
Tule Lake, Calif.

Application March 6, 1948, Serial No. 13,504

2 Claims. (Cl. 97—47.63)

This invention is directed to, and it is an object to provide, an improved draft unit for wheel tractors; such draft unit being of the type which includes a tool bar assembly for earth working tools, such as plows, ditchers, etc.

Another object of the invention is to provide a draft unit for wheel tractors which is operative to minimize slippage and increase the traction of the drive wheels of the tractor; this being accomplished, through the medium of a novel structural arrangement, by converting the drag or resistance to forward motion of the earth working tools into a downward pull on the rear axle of the tractor; thus urging the rear drive wheels into more effective ground engagement.

It is also an object of the invention to provide a draft unit which accomplishes the aforesaid more effective traction without tendency of the fore part of the tractor to lift. On the contrary, the steering of the tractor is improved on account of better front wheel traction.

A further object of the present invention is to provide the draft unit with a novel power lift unit by means of which the tools may be raised or lowered between working and non-working positions, or their working depth effectively controlled. The draft unit, when in working position, effectively maintains the attached tool at a substantially uniform working depth.

An additional object is to provide a draft unit which is designed so that it may be attached to a conventional wheel tractor with a minimum of accessory parts; the attachment, or detachment, of the draft unit being accomplished readily and easily.

A further object of the invention is to provide a practical and convenient draft unit for wheel tractors which will be exceedingly effective for the purpose for which it is designed.

These objects are accomplished by means of such structure and relative arrangement of parts as will fully appear by a perusal of the following specification and claims.

Figure 1:
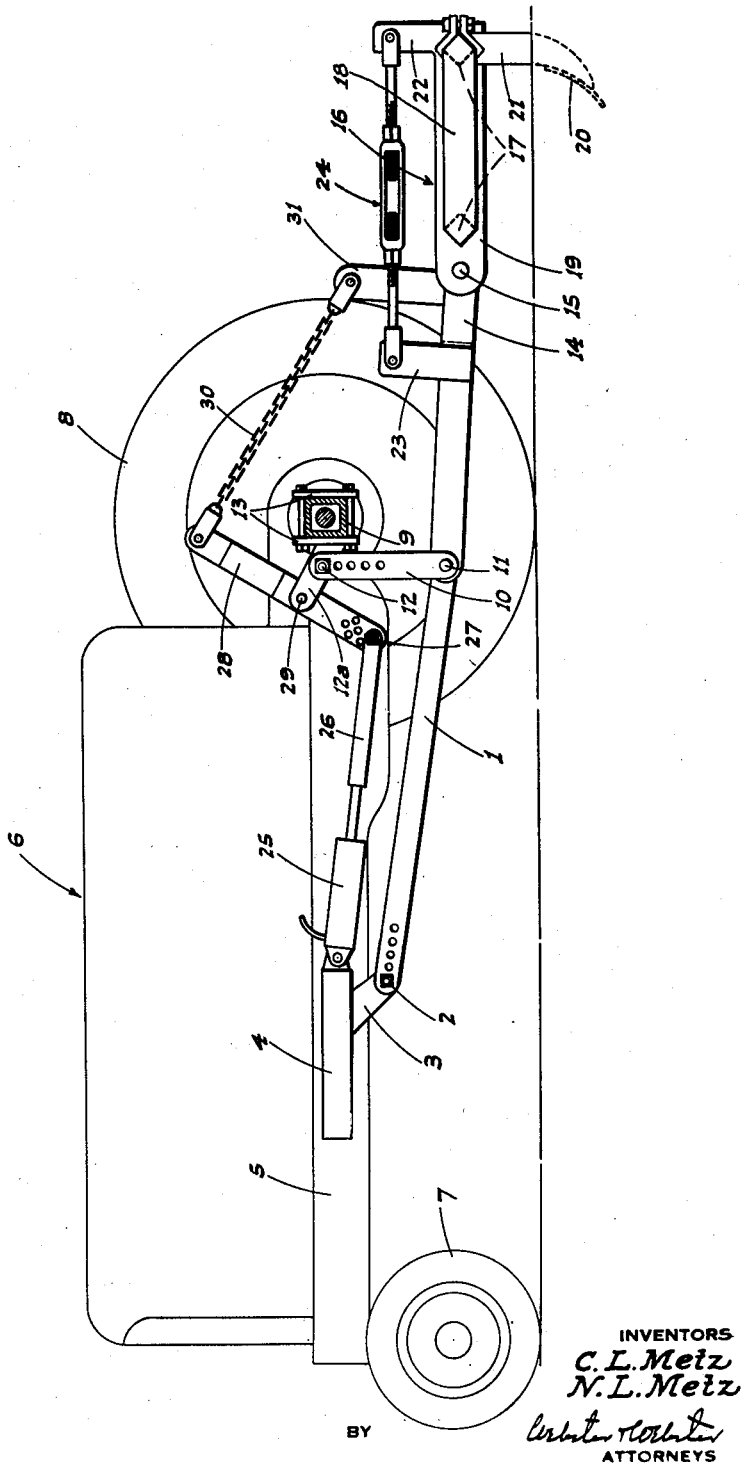
Fig. 1 is a side elevation of the improved draft unit as applied to a wheel-type tractor.
Figure 2:
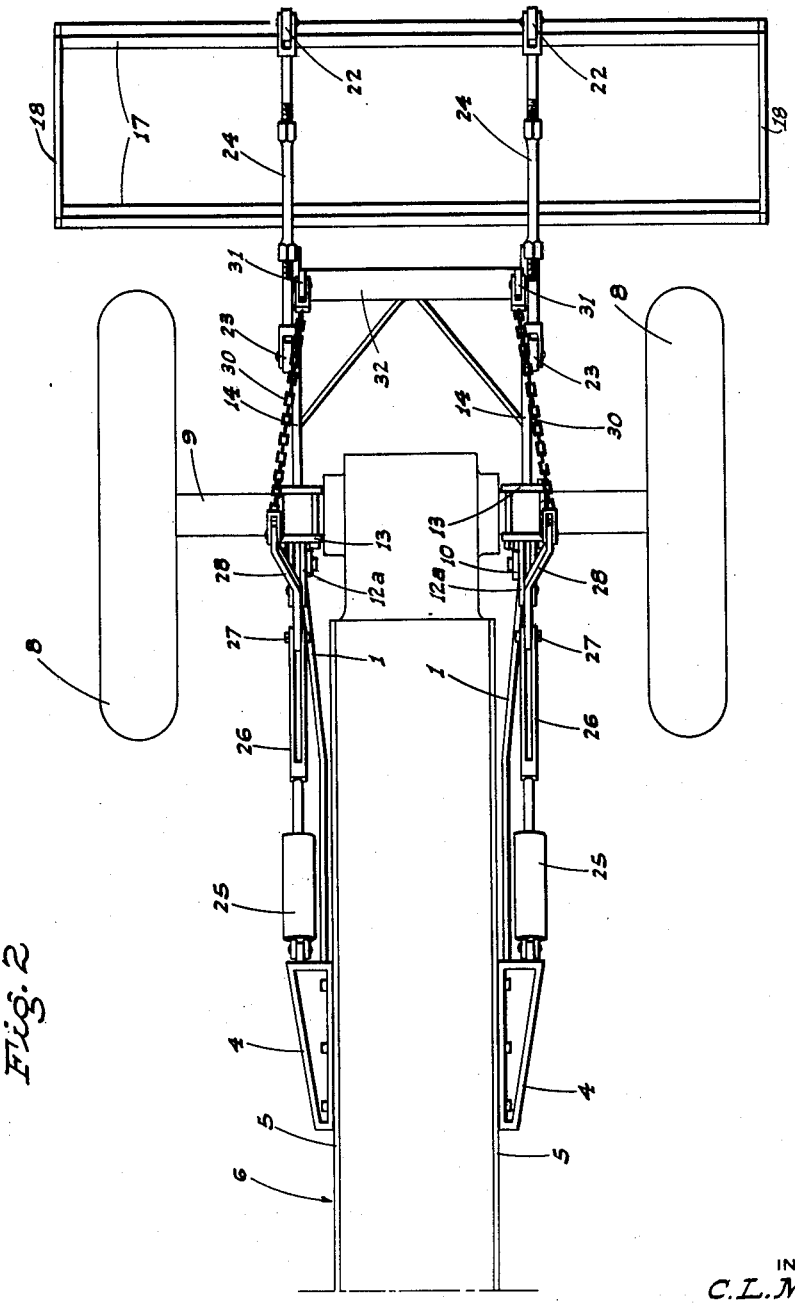
Fig. 2 is a plan view of the same.

Referring now more particularly to the characters of reference on the drawings, the improved draft unit for wheel tractors comprises a pair of transversely spaced drawbars 1 adjustably pivotally connected, as at 2, to ears 3 depending from brackets 4 attached to opposite sides of the frame 5 of a tractor, indicated generally at 6, intermediate the front and rear wheels of the same. The front wheels of the tractor are indicated at 7, while the relatively larger rear and driving wheels are indicated at 8.

From the front-end pivotal connections 2, the drawbars 1 extend, in parallel relation, at a rearward and downward incline in spaced relation beneath the rear axle housing 9 of the tractor 6, terminating, at their lower ends, just forward of said housing. Rigid links 10 are pivotally connected at their lower ends to the rear ends of the drawbars 1, as at 11, and thence extend upwardly to vertically adjustable connection, as at 12, with corresponding bracket arms 12a intermediate their ends; said bracket arms projecting at a forward and upward incline from clamps 13 affixed to said rear axle housing 9.

A pair of transversely spaced draft links 14, corresponding to the drawbars 1, are pivotally connected at their forward ends with the rear ends of said drawbars 1 and lower ends of said links 10 by means of the pivots 11. The draft links 14 extend rearwardly, as shown, and at their rear ends are pivoted, as at 15, in connection with a tool bar assembly, indicated generally at 16.

This tool bar assembly comprises a pair of spaced, transversely extending tool bars 17 of substantial length connected together at their outer ends by end plates 18.

Intermediate their ends, and in general alinement with the draft links 14, the tool bar assembly 16 includes, in rigid relation, a pair of longitudinally extending attachment bars 19; the pivots 15 connecting the rear ends of the draft links 14 to the forward ends of said attachment bars 19.

Earth working tools, as at 20, are connected in rigid relation to one or both of the tool bars 17 below the same by means such as standards 21. It is to be understood that different types of earth working tools may be attached to the bars 17.

At their rear end portions the attachment bars 19 are formed with rigid upstanding arms 22, and other rigid arms 23 are fixed in connection with, and upstand from, the draft links 14 intermediate the ends of the latter. Longitudinally corresponding arms 22 and 23 are connected adjacent their upper ends by means of adjustable turnbuckle links 24.

When the above described draft unit is in operation, the drag or resistance to forward motion of the tools 20 reacts in a manner tending to urge the forward ends of the draft links 14 in a downward direction, imparting substantial downward tension on the links 10. Such downward tension on the links 10, acting through the rear axle housing 9 of the tractor, urges the rear driving wheels 8 positively and effectively into ground engagement, so as to minimize slippage and enhance the traction of said wheels. Thus, as working conditions cause a greater drag or draft to reflect from the ground working tools 20, the better will be the traction of the rear wheels 8 on the ground. Additionally, with the points of draft connection ahead of the rear axle, the front wheels of the tractor are maintained effectively in ground contact so that steering is improved.

The working depth of the tools 20 is controlled, or said tools can be raised between working and non-working positions, by means of the following power lift unit:

A pair of fluid pressure actuated power cylinders 25, on opposite sides of the tractor, controlled through the medium of a valve regulated fluid pressure system (not shown), are pivotally connected to the brackets 4 and extend rearwardly. Connecting rods 26 of said cylinders 25 project rearwardly, and are adjustably pivotally connected, as at 27, with the lower end of swing levers 28. The levers 28 extend at an upward and rearward incline, and are pivotally connected, intermediate their ends, as at 29, to the outer ends of the bracket arms 12a carried by the clamps 13. The upper ends of the swing levers 28 extend some distance above the rear axle housing 9, and chains 30 connect between said upper ends of the levers 28 and rigid arms 31 upstanding from the draft links 14 adjacent the rear ends of the latter; there being a cross brace 32 between said arms 31 to stabilize the assembly against lateral swaying.

Upon operation of the power cylinders 25, the swing levers 28 are actuated in directions to impart lifting or lowering of the tool bar assembly 16 by means of the chains 30 and arms 31.

The adjustable turnbuckle links 24 provide a means whereby a nicety of adjustment of the tool bar assembly 16, and the tools 20, can be accomplished relative to the remainder of the draft unit, and to the ground.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

This application is a continuation-in-part of our application, Serial No. 740,846, filed April 11, 1947, and now abandoned.

Having thus described the invention, the following is claimed as new and useful, and upon which Letters Patent are desired:

1. In a draft unit for a tractor, a pair of transversely spaced drawbars mounted on the tractor, links connected to and projecting rearwardly from the drawbars, a tool bar assembly pivotally connected to the links at their rear end and means additionally connecting the links to the tool bar assembly for adjustment of the latter relative to the links in a vertical plane while maintaining the assembly and links rigid with each other in any position of adjustment; said means comprising arms rigid with and upstanding from the links intermediate their ends, corresponding arms rigid with and upstanding from the tool bar assembly rearwardly of the first named arms, and longitudinally contractible and extensible members connecting corresponding ones of the arms at their upper end.

2. A draft unit for a wheeled tractor having a frame and a rear axle housing, said draft unit comprising a pair of transversely spaced drawbars attached at their front end to the frame ahead of the axle housing and extending below said housing, a tool bar assembly connected to the rear end of the drawbars and extending in trailing relation thereto, and means suspending the draft unit adjacent its rear end from the axle housing and comprising rigid bracket arms on the forward side of the housing directly above the drawbars, suspension links connecting the arms and drawbars, and rigid means clamping the arms on the housing.

References Cited in the file of this patent

UNITED STATES PATENTS

| Number | Name | Date |
|---|---|---|
| 1,378,842 | Dittbrenner | May 24, 1921 |
| 2,167,210 | Imsick | July 25, 1939 |
| 2,264,575 | Knapp et al. | Dec. 2, 1941 |
| 2,352,281 | Mott | June 27, 1944 |
| 2,429,552 | Hyland et al. | Oct. 21, 1947 |
| 2,440,550 | Martin | Apr. 27, 1948 |
| 2,456,693 | Fraga | Dec. 21, 1948 |
| 2,492,573 | Hearron | Dec. 27, 1949 |
| 2,567,736 | Silver et al. | Sept. 11, 1951 |
| 2,618,212 | Hedquist et al. | Nov. 18, 1952 |